(12) United States Patent
Hachiya et al.

(10) Patent No.: US 9,789,773 B2
(45) Date of Patent: Oct. 17, 2017

(54) POWER CONVERSION APPARATUS AND POWER CONTROL METHOD

(71) Applicant: OMRON AUTOMOTIVE ELECTRONICS CO., LTD., Aichi (JP)

(72) Inventors: Koji Hachiya, Kasugai (JP); Yusaku Ido, Kani (JP); Yasumichi Omoto, Kasugai (JP); Masayuki Hanatani, Kasugai (JP); Hajime Tamanaha, Kasugai (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 239 days.

(21) Appl. No.: 14/844,542

(22) Filed: Sep. 3, 2015

(65) Prior Publication Data
US 2015/0375626 A1 Dec. 31, 2015

Related U.S. Application Data

(62) Division of application No. 13/409,621, filed on Mar. 1, 2012, now Pat. No. 9,156,361.

(30) Foreign Application Priority Data

Mar. 1, 2011 (JP) ................................ 2011-043518

(51) Int. Cl.
*B60L 11/18* (2006.01)
*B60L 1/00* (2006.01)
(Continued)

(52) U.S. Cl.
CPC .......... *B60L 11/1805* (2013.01); *B60L 1/003* (2013.01); *B60L 1/14* (2013.01); *B60L 3/003* (2013.01);
(Continued)

(58) Field of Classification Search
USPC .............................. 307/10.1, 10.7, 52, 55, 62
See application file for complete search history.

(56) References Cited

U.S. PATENT DOCUMENTS 6,154,015 A 11/2000 Ichiba
8,143,859 B2 3/2012 Iida
(Continued)

FOREIGN PATENT DOCUMENTS

JP 10-323027 A 12/1998
JP 2000-201473 A 7/2000
(Continued)

OTHER PUBLICATIONS

Office Action in counterpart Japanese Patent Application No. 2011-043518 dated Jul. 1, 2014 (3 pages).
Office Action in counterpart Japanese Patent Application No. 2011-043518 dated Sep. 30, 2014 (8 pages).

*Primary Examiner* — An Luu
(74) *Attorney, Agent, or Firm* — Osha Liang LLP

(57) ABSTRACT

Charge efficiency of normal charge is improved without restricting an operation of a low-voltage load of an electric vehicle during the normal charge. During a charge of a high-voltage battery of a vehicle, when a determination of the normal charge is made, and when a determination that a mode switching target load is not operated is made, power saving mode transition processing is performed. Therefore, an operating mode of a DC-DC converter, which steps down a voltage at the high-voltage battery and supplies the stepped-down voltage to a low-voltage battery and a low-voltage load, is set to a power saving mode in which consumption power is reduced compared with a normal mode. When a determination that a start-up manipulation of the mode switching target load is performed is made, the operating mode of the DC-DC converter is changed to the normal mode.

8 Claims, 15 Drawing Sheets

(51) Int. Cl.
 *B60L 1/14* (2006.01)
 *B60L 3/00* (2006.01)

(52) U.S. Cl.
 CPC ......... *B60L 11/1803* (2013.01); *B60L 11/185* (2013.01); *B60L 11/1809* (2013.01); *B60L 11/1816* (2013.01); *B60L 11/1868* (2013.01); *B60L 2210/12* (2013.01); *B60L 2210/30* (2013.01); *B60L 2240/525* (2013.01); *B60L 2240/527* (2013.01); *B60L 2240/529* (2013.01); *B60L 2250/16* (2013.01); *Y02T 10/7005* (2013.01); *Y02T 10/7066* (2013.01); *Y02T 10/7072* (2013.01); *Y02T 10/7233* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(56)    References Cited

U.S. PATENT DOCUMENTS

| | | |
|---|---|---|
| 8,423,210 B2 | 4/2013 | Kato |
| 8,478,469 B2 | 7/2013 | Ueo et al. |
| 9,156,361 B2 * | 10/2015 | Hachiya .................. B60L 1/003 |
| 2005/0063201 A1 | 3/2005 | Yamazaki |
| 2012/0123625 A1 | 5/2012 | Ueo et al. |

FOREIGN PATENT DOCUMENTS

| | | | |
|---|---|---|---|
| JP | 2004-222429 A | 8/2004 | |
| WO | 2011/016134 A1 | 2/2011 | |

\* cited by examiner

POWER CONVERSION APPARATUS AND POWER CONTROL METHOD

CROSS-REFERENCE TO RELATED APPLICATIONS

This application is a division of U.S. patent application Ser. No. 13/409,621, filed Mar. 1, 2012, which claims priority to Japanese Patent Application No. JP2011-043518, filed Mar. 1, 2011. The contents of the priority applications are incorporated by reference in their entirety.

TECHNICAL FIELD

One or more embodiments of present invention relate to a power conversion apparatus and a power control method, and particularly, to a power conversion apparatus and a power control method for improving charge efficiency of a normal charge of an electric vehicle.

RELATED ART

Usually, two types of batteries of a high-voltage battery and a low-voltage battery are provided in an electric vehicle such as an EV (Electric Vehicle), an HEV (Hybrid Electric Vehicle), and a PHEV (Plug-in Hybrid Electric Vehicle).

The high-voltage battery is mainly used as a power supply for a high-voltage load such as a main engine motor for driving wheels of the electric vehicle to allow the vehicle to travel and a compressor motor of an NC (air conditioner).

The low-voltage battery is mainly used as a power supply for a low-voltage load such as various ECUs (Electronic Control Units), an EPS (Electric Power Steering), electric brake(s), car audio instrument(s), wiper(s), power window motor(s), and illumination lamp(s).

For example, the high-voltage battery can be charged by two types of charge methods of a quick charge and a normal charge. The quick charge is the charge method in which the high-voltage battery is connected to a dedicated quick charge apparatus and charged in a short time using a large current. The normal charge is the charge method in which an in-vehicle charger provided in the electric vehicle is connected through a dedicated outlet cable to a standard outlet of standard home or an office to charge the high-voltage battery using an electric power supplied from a power supply beyond the connected outlet.

For example, the low-voltage battery is charged such that a voltage at the high-voltage battery is supplied while stepped down with a DC-DC converter. Accordingly, the DC-DC converter is operated in order to charge the low-voltage battery when the normal charge of the high-voltage battery is performed. Because of long hours (for example, 8 hours) of the normal charge, a total power loss of the DC-DC converter becomes a considerable value to affect charge efficiency.

On the other hand, conventionally, in a switching power supply such as the DC-DC converter, it is devised that the power loss is reduced to achieve high efficiency.

For example, there is proposed a switching power supply device that reduces a switching loss by switching a frequency according to an output power (for example, see Japanese Unexamined Patent Publication No. 2004-222429).

There is also proposed a DC-DC converter in which, in a consumption current necessary to generate an internal clock, an amount of current necessary to charge or discharge a gate capacitance of a switching transistor is reduced by lowering the frequency in pulse width modulation control of the lightly-loaded switching transistor (for example, see Japanese Unexamined Patent Publication No. 2000-201473).

There is also proposed a power supply circuit that implements high energy conversion efficiency by varying an oscillation frequency of the DC-DC converter according to an output current of the DC-DC converter (for example, see Japanese Unexamined Patent Publication No. 10-323027).

SUMMARY

One or more embodiments of the present invention improve charge efficiency of a normal charge without restricting an operation of a low-voltage load of an electric vehicle during the normal charge.

In accordance with one aspect of one or more embodiments of the present invention, a power conversion apparatus includes: a switching element that is driven to step down a voltage of a first battery for run of an electric vehicle, the stepped-down voltage being supplied to a second battery and a plurality of loads; a switching control unit that controls drive of the switching element; a load monitoring unit that detects existence or non-existence of a start-up manipulation of a predetermined target load in the loads; a charge detection unit that detects existence or non-existence of a charge and a charge method of the first battery; and a mode setting unit that sets a supply operating mode of the power conversion apparatus to a second mode whose consumption power is less than that of a first mode during the charge of the first battery, and changes the second mode to the first mode when the load monitoring unit detects the start-up manipulation of the target load while the supply operating mode is set to the second mode.

The power conversion apparatus includes the switching element that is driven to step down the voltage of the first battery for the run of the electric vehicle, and the stepped-down voltage is supplied to the second battery and the plurality of loads. In the power conversion apparatus, the drive of the switching element is controlled, the existence or non-existence of the start-up manipulation of the predetermined target load is detected, the existence or non-existence of the charge and the charge method of the first battery are detected; the supply operating mode of the power conversion apparatus is set to the second mode whose consumption power is less than that of the first mode during the charge of the first battery, and the second mode is changed to the first mode when the start-up manipulation of the target load is detected while the supply operating mode is set to the second mode.

Accordingly, the charge efficiency of the normal charge can be improved without restricting the operation of the low-voltage load of the electric vehicle during the normal charge.

For example, the power conversion apparatus is constructed by the DC-DC converter. For example, the switching control unit, the load monitoring unit, the charge detection unit, and the mode setting unit are constructed by a processing unit such as a CPU and an MPU.

The power conversion apparatus may further includes a parameter detection control unit that stops detection of at least one parameter, which is used to control the drive of the switching element, when the supply operating mode is set to the second mode.

Therefore, the electric power that is consumed by the parameter detection can be reduced during the normal charge of the electric vehicle.

For example, the parameter detection control unit is constructed by the processing unit such as the CPU and the MPU.

In the power conversion apparatus, the switching control unit may not perform response processing during an abnormality of the parameter, in which the detection is stopped, when the supply operating mode is set to the second mode.

Therefore, the electric power that is consumed by the response processing during the abnormality of the parameter can be reduced during the normal charge of the electric vehicle.

The power conversion apparatus may further includes a control-cycle control unit that lengthens a control cycle of the power conversion apparatus compared with the first mode when the supply operating mode is set to the second mode.

Therefore, the electric power that is consumed by the control of the power conversion apparatus can be reduced during the normal charge of the electric vehicle.

In the power conversion apparatus, the control cycle may include at least one of a cycle during which the parameter used to control the drive of the switching element is detected and a cycle during which the drive of the switching element is controlled.

Therefore, at least one of the electric power that is consumed by the parameter detection and the electric power that is consumed by the drive control of the switching element can be reduced during the normal charge of the electric vehicle.

In the power conversion apparatus, the parameter may include at least one of an input voltage, an input current, an output voltage, an output current, and a temperature of the power conversion apparatus.

In the power conversion apparatus, the load monitoring unit may further detect a state of the target load, and the mode setting unit sets the supply operating mode to the first mode when the target load is operated at the beginning of a normal charge of the first battery.

Therefore, the target load can be operated during the normal charge of the electric vehicle.

In the power conversion apparatus, the mode setting unit may change the first mode to the second mode when the stops of all the target load are detected while the supply operating mode is set to the first mode during the normal charge of the first battery.

Therefore, the charge efficiency can further be improved during the normal charge of the electric vehicle.

In the power conversion apparatus, the mode setting unit may fix the supply operating mode to the first mode during a quick charge of the first battery.

Therefore, the low-voltage load can be operated during the quick charge of the electric vehicle.

In accordance with another aspect of one or more embodiments of the present invention, a power control method performed by a power conversion apparatus, which includes a switching element that is driven to step down a voltage of a first battery for run of an electric vehicle, the stepped-down voltage being supplied to a second battery and a plurality of loads, the power control method includes a steps of: detecting existence or non-existence of a start-up manipulation of a predetermined target load in the loads; detecting existence or non-existence of a charge and a charge method of the first battery; and setting a supply operating mode of the power conversion apparatus to a second mode whose consumption power is less than that of a first mode during the charge of the first battery, and changing the second mode to the first mode when the start-up manipulation of the target load is detected while the supply operating mode is set to the second mode.

The power conversion method is performed by the power conversion apparatus, which includes a switching element that is driven to step down a voltage of a first battery for run of an electric vehicle, and the stepped-down voltage is supplied to a second battery and the plurality of loads. In the power conversion method, the existence or non-existence of the start-up manipulation of the predetermined target load is detected, the existence or non-existence of the charge and the charge method of the first battery are detected; the supply operating mode of the power conversion apparatus is set to the second mode whose consumption power is less than that of the first mode during the charge of the first battery, and the second mode is changed to the first mode when the start-up manipulation of the target load is detected while the supply operating mode is set to the second mode.

Accordingly, the charge efficiency of the normal charge can be improved without restricting the operation of the low-voltage load of the electric vehicle during the normal charge.

For example, the power conversion apparatus is constructed by the DC-DC converter.

According to one or more embodiments of the present invention, the charge efficiency of the normal charge can be improved without restricting the operation of the low-voltage load of the electric vehicle during the normal charge.

DETAILED DESCRIPTION

Hereinafter, embodiments of the present invention will be described with reference to the drawings. In the embodiments presented in this specification, numerous specific details are set forth in order to provide a more thorough understanding of the present invention. However, it will be apparent to one of ordinary skill in the art that the present invention may be practiced without these specific details. In other instances, well-known features have not been described in detail to avoid obscuring the present invention.

Figure 1:
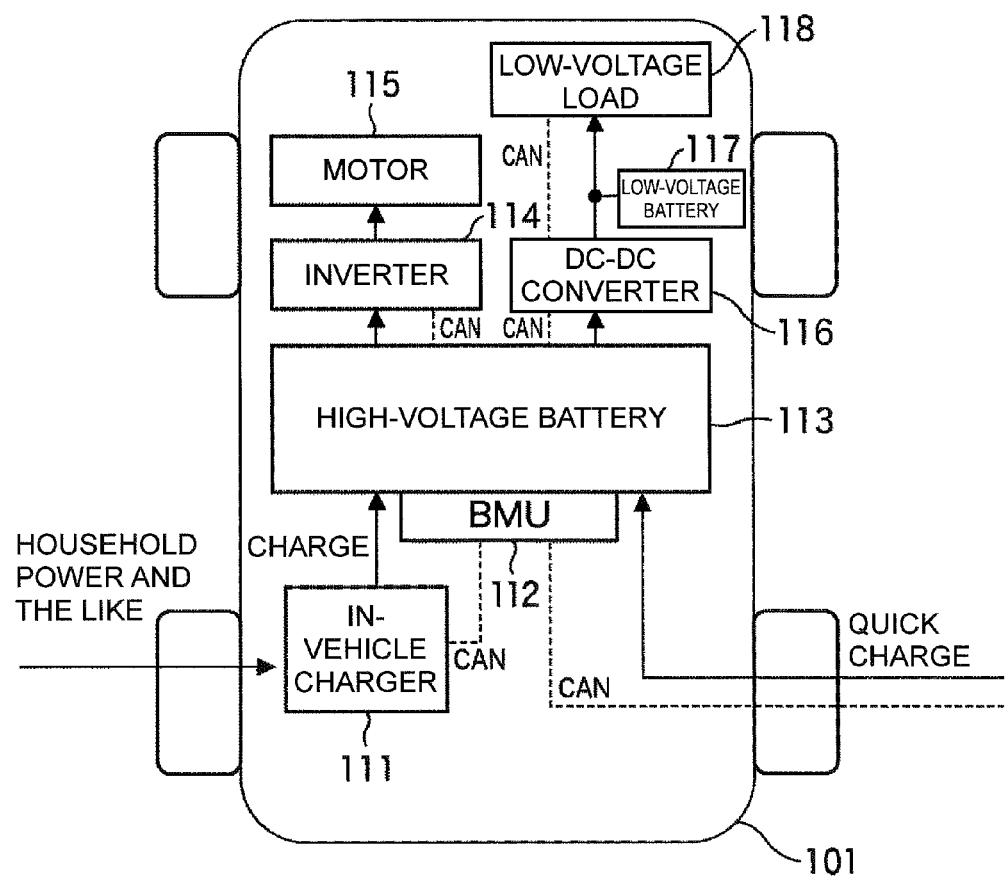
FIG. 1 is a block diagram illustrating a configuration example of an electric system of a vehicle on which a DC-DC converter according to one or more embodiments of the present invention is mounted.

FIG. 1 is a block diagram illustrating a configuration example of an electric system of a vehicle on which a DC-DC converter according to one or more embodiments of the present invention is mounted.

A vehicle 101 is an electric vehicle in which a high-voltage battery 113 is used as an energy source.

The high-voltage battery 113 can be charged by the two types of the charge methods of the quick charge and the normal charge.

The quick charge in which a large current is consumed is the charge method in which the high-voltage battery 113 of the vehicle 101 is connected to a dedicated quick charge apparatus (not illustrated) and charged in a short time.

On the other hand, the normal charge in which a smaller current is consumed compared with the quick charge is the charge method in which an in-vehicle charger 111 of the vehicle 101 is connected through a dedicated outlet cable to a standard outlet of standard home or an office and charges the high-voltage battery 113 using an electric power supplied from a power supply beyond the connected outlet.

A BMU 112 conducts communication with the in-vehicle charger 111 and a quick charge apparatus in conformity to CAN (Controller Area Network), and controls the normal charge and the quick charge of the high-voltage battery 113.

The electric power of the high-voltage battery 113 is converted from a direct current into an alternating-current with an inverter 114, and supplied to a motor 115 that drives run of the vehicle 101. The electric power of the high-voltage battery 113 is stepped down to a predetermined voltage by a DC-DC converter 116, and supplied to a low-voltage battery 117 and a low-voltage load 118. In addition to the motor 115 and the DC-DC converter 116, the electric power of the high-voltage battery 113 is also supplied to a high-voltage load, such as a compressor motor of an air conditioner (not illustrated), which is operated at a high voltage.

The low-voltage battery 117 is charged by the electric power supplied from the DC-DC converter 116, and the low-voltage battery 117 supplies the electric power to the low-voltage load 118.

Examples of the low-voltage load 118 that is operated at a low voltage include various ECUs, an EPS, electric brake(s), car audio device(s), car navigation device(s), wiper(s), power window motor(s), illumination lamp(s), and control circuitry of the air conditioner.

The in-vehicle charger 111, the BMU 112, the inverter 114, the DC-DC converter 116, and some of the low-voltage loads 118 (for example, the ECU) conduct communication with one another in conformity to CAN, and transmit and receive a state of each unit of the vehicle 101, signals indicating various instructions and the like, and information to and from one another.

As described later, the DC-DC converter 116 switches between operating modes during the charge of the high-voltage battery 113 based on a manipulation or a state of a predetermined load (hereinafter, referred to as a mode switching target load) in the low-voltage loads 118.

The mode switching target load is the low-voltage load 118 that is used to determine the switching of the operating mode of the DC-DC converter 116 during the charge of the high-voltage battery 113. The low-voltage loads 118, such as the car audio device(s), the car navigation device(s), and the control circuitry of the air conditioner, which can be started up and stopped by user manipulation during the charge of the high-voltage battery 113 are selected as the mode switching target load. The low-voltage load 118 that is always operated during the charge of the high-voltage battery 113 is excluded from the mode switching target load.

Figure 2:
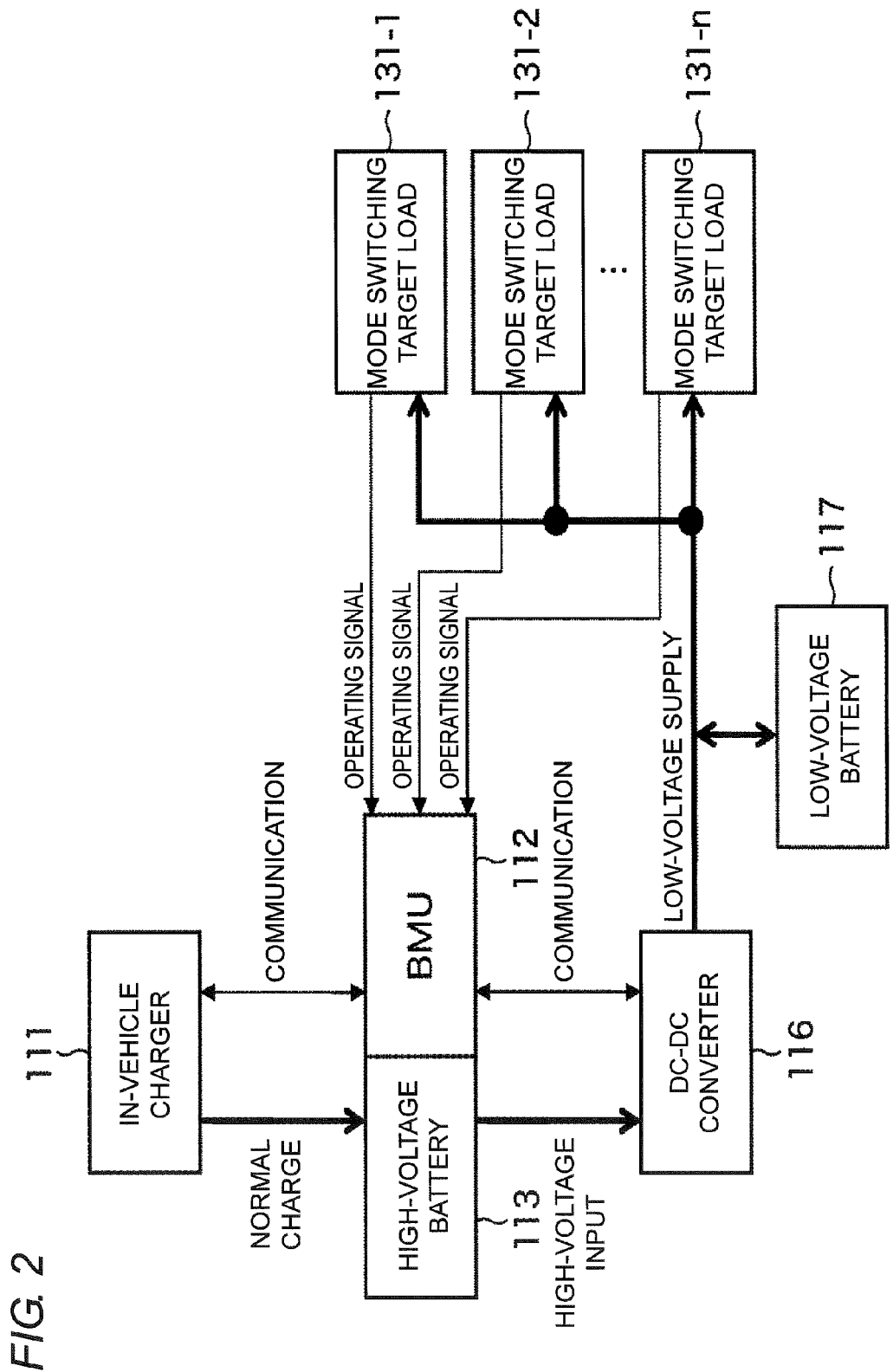
FIG. 2 is a block diagram illustrating an example of a supply route of an electric power and a communication route according to one or more embodiments of the present invention.

FIG. 2 is a block diagram illustrating a supply route of the electric power and a communication route among the in-vehicle charger 111, the BMU 112, the high-voltage battery 113, the DC-DC converter 116, the low-voltage battery 117, and mode switching target loads 131-1 to 131-n.

As described above, the in-vehicle charger 111 performs the normal charge of the high-voltage battery 113. The electric power of the high-voltage battery 113 is input to the DC-DC converter 116, stepped down to a predetermined voltage by the DC-DC converter 116, and supplied to the low-voltage battery 117 and the mode switching target loads 131-1 to 131-n.

The in-vehicle charger 111, the BMU 112, the DC-DC converter 116, and the mode switching target loads 131-1 to 131-n conduct communication with one another in conformity to CAN. The mode switching target loads 131-1 to 131-n transmit operating signals indicating the type of the manipulation performed by a user, the state, and the like to the BMU 112. The BMU 112 transmits the operating signals received from the mode switching target loads 131-1 to 131-n to the DC-DC converter 116 as needed. Therefore, the DC-DC converter 116 can recognize the operation situations or the states of the mode switching target loads 131-1 to 131-n.

Hereinafter, the mode switching target loads 131-1 to 131-n are simply referred to as mode switching target loads 131 unless the mode switching target loads 131-1 to 131-n are distinguished from each other.

[Configuration Example of DC-DC Converter 116]

Figure 3:
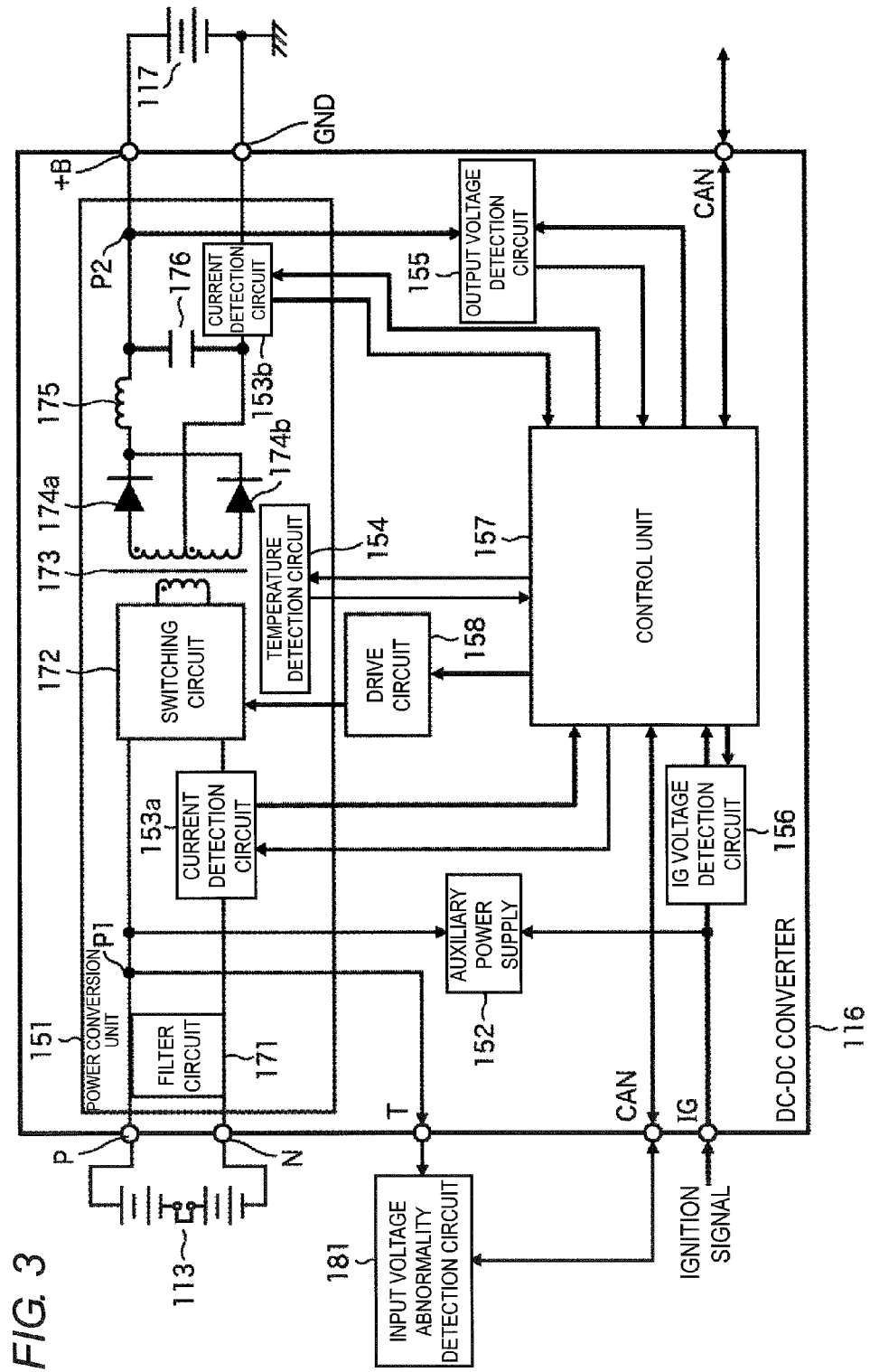
FIG. 3 is a circuit diagram illustrating a configuration example of the DC-DC converter according to one or more embodiments of the present invention.

FIG. 3 is a circuit diagram illustrating a configuration example of the DC-DC converter 116.

The DC-DC converter 116 includes a power conversion unit 151, an auxiliary power supply 152, current detection circuits 153a and 153b, a temperature detection circuit 154, an output voltage detection circuit 155, an IG (ignition) voltage detection circuit 156, a control unit 157, and a drive circuit 158. The power conversion unit 151 includes a filter circuit 171, a switching circuit 172, a transformer 173, diodes 174a and 174b, a coil 175, and a capacitor 176.

In the DC-DC converter 116, an input terminal P is connected to a positive electrode of the high-voltage battery 113, and an input terminal N is connected to a negative electrode of the high-voltage battery 113. In the DC-DC converter 116, an output terminal +B is connected to a positive electrode of the low-voltage battery 117, and an output terminal GND is grounded while connected to a negative electrode of the low-voltage battery 117.

Figure 4:
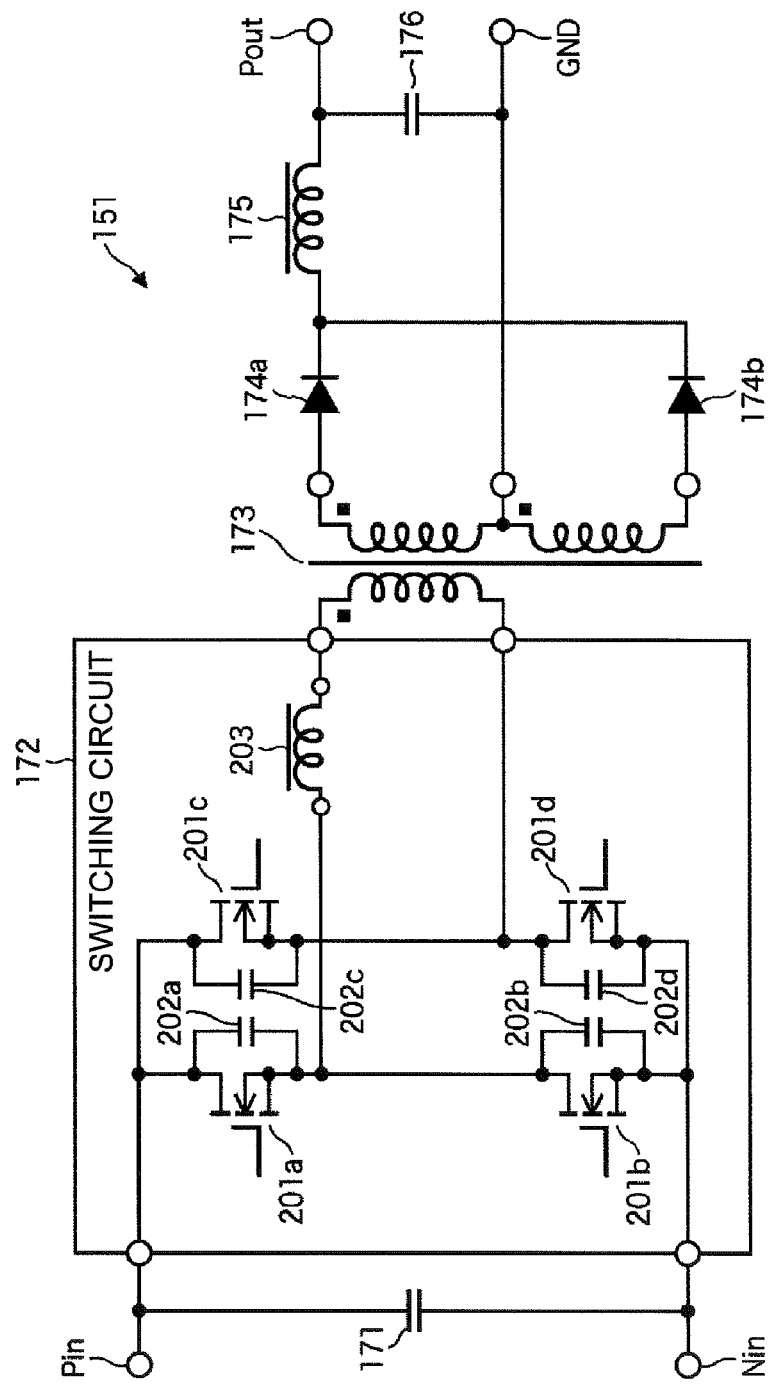
FIG. 4 is a circuit diagram illustrating a configuration example of a power conversion unit of the DC-DC converter according to one or more embodiments of the present invention.

An input voltage abnormality detection circuit 181 that may also be included in the system shown in FIG. 1 is illustrated in FIG. 4.

For example, the switching circuit 172 of the power conversion unit 151 is constructed by a full-bridge or half-bridge inverter in which a switching element such as a MOSFET (Metal Oxide Semiconductor Field Effect Transistor) is used. The switching circuit 172 performs alternating-current conversion of the electric power supplied from the high-voltage battery 113. The filter circuit 171 plays a role in removing a high-frequency noise, which is generated by switching control of the switching circuit 172, such that the noise leaks to the outside from an input side of the DC-DC converter 116. The filter circuit 171 also plays a role in removing a drive noise from the motor 115 of FIG. 1.

While the transformer 173 performs voltage conversion of the electric power, to which the alternating-current conversion is performed by the switching circuit 172, a rectifying circuit including the transformer 173 and the diodes 174a and 174b performs direct-current conversion of the electric power into a predetermined voltage (for example, 14 V). A harmonic component is removed by an LC filter including the coil 175 and the capacitor 176, and the direct-current electric power whose voltage is converted is output.

The auxiliary power supply 152 converts the voltage of the electric power supplied from the high-voltage battery 113 into a predetermined voltage (for example, 12 V), and supplies the converted electric power as an operating power supply to the control unit 157.

The current detection circuit 153a detects a current before the current is input to the switching circuit 172, namely, detects an input current Iin of the DC-DC converter 116, and supplies a signal indicating a detection result to the control unit 157.

The current detection circuit 153b detects an output current Iout of the DC-DC converter 116 (power conversion unit 151), and supplies a signal indicating a detection result to the control unit 157.

Hereinafter, the current detection circuits 153a and 153b are simply referred to as current detection circuits 153 unless the current detection circuits 153a and 153b are distinguished from each other.

For example, the temperature detection circuit 154 is placed near the switching element in the switching circuit 172. The temperature detection circuit 154 detects a temperature Ta in a surrounding area of the switching circuit 172, and supplies a signal indicating a detection result to the control unit 157.

The output voltage detection circuit 155 detects an output voltage Vout of the DC-DC converter 116 (power conversion unit 151) at a detection point P2 between the capacitor 176 and the output terminal +B, and supplies a signal indicating a detection result to the control unit 157.

The IG voltage detection circuit 156 detects an IG voltage Vig based on an ignition signal, which is input from an ignition power supply of the vehicle 101 through an input terminal IG, and supplies a signal indicating a detection result to the control unit 157.

The ignition signal is also supplied to the auxiliary power supply 152.

The input voltage abnormality detection circuit 181 detects existence or non-existence of an abnormality of the input voltage Vin at a detection point P1 between the filter circuit 171 and the switching circuit 172, and the input voltage Vin is output from a terminal T of the DC-DC converter 116. The input voltage abnormality detection circuit 181 supplies a signal indicating a detection result to the control unit 157 through the communication conforming to CAN.

The control unit 157 sets target values of the switching frequency of the switching circuit 172 and the output voltage Vout based on the input current Iin, the output voltage Vout, the output current Iout, the temperature Ta in the surrounding area of the switching circuit, and the existence or non-existence of the abnormality of the input voltage Vin. The control unit 157 provides the set target values of the switching frequency and the output voltage Vout as instruction values to the drive circuit 158. The control unit 157 conducts communication with the external devices such as the BMU 112 and the low-voltage load 118 in conformity to CAN, and transmits and receives various signals and various pieces of information. The control unit 157 sets the operating mode of the DC-DC converter 116 based on the existence or non-existence of the charge and the charge method of the high-voltage battery 113, the manipulation performed to each of the mode switching target loads 131, and the state of the mode switching target load 131.

The drive circuit 158 performs PWM control (for example, control of a duty ratio) of the switching circuit 172 while supplying a drive signal, which has the instructed switching frequency from the control unit 157, to the switching circuit 172, and the drive circuit 158 controls the output voltage of the switching circuit 172 such that the output voltage Vout of the power conversion unit 151 becomes the instruction value from the control unit 157.

[Configuration Example of Power Conversion Unit 151]

FIG. 4 illustrates a configuration example of the power conversion unit 151 of the DC-DC converter 116.

For example, the power conversion unit 151 is constructed by a resonant power supply illustrated in FIG. 4.

In the power conversion unit 151 of FIG. 4, the filter circuit 171 is constructed by a capacitor. The switching circuit 172 is constructed by a single-phase full-bridge inverter, and the inverter includes switching elements 201a to 201d, capacitors 202a to 202d, and a coil 203.

[Configuration Example of Current Detection Circuit 153]

Figure 5:
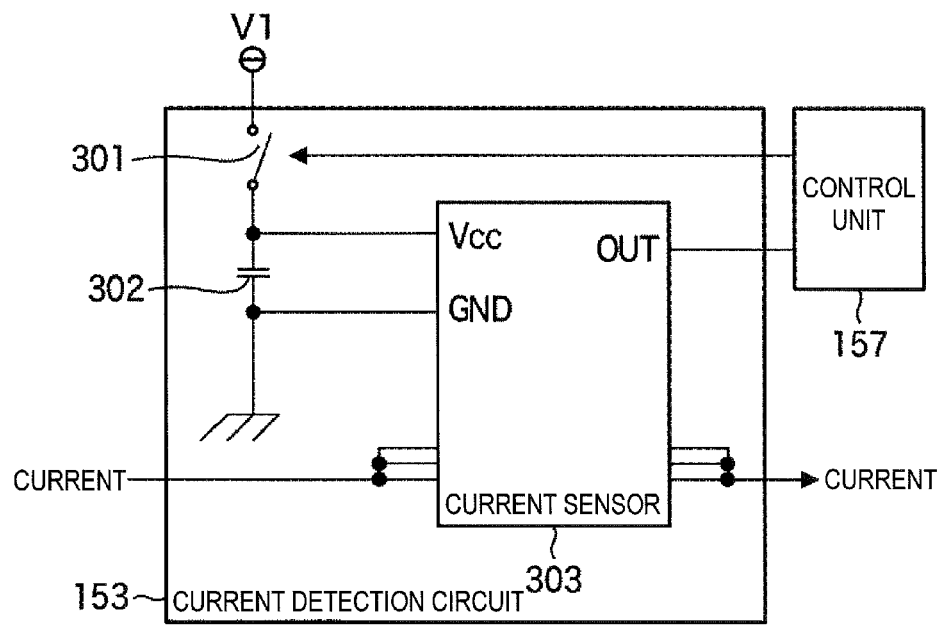
FIG. 5 is a circuit diagram illustrating a configuration example of a current detection circuit according to one or more embodiments of the present invention.

FIG. 5 illustrates a configuration example of the current detection circuit 153.

The current detection circuit 153 includes a semiconductor switch 301, a capacitor 302, and a current sensor 303.

One end of the semiconductor switch 301 is connected to a power supply V1, and the other end is connected to a terminal Vcc of the current sensor 303 and one end of the capacitor 302. The other end of the capacitor 302 is grounded while connected to the terminal GND of the current sensor 303. An output terminal OUT of the current sensor 303 is connected to the control unit 157.

The semiconductor switch 301 is turned on and off under the control of the control unit 157. When the semiconductor switch 301 is turned on, the current sensor 303 detects the current, and outputs a signal indicating a detection result from the terminal OUT to the control unit 157. On the other hand, when the semiconductor switch 301 is turned off, the current sensor 303 stops the current detection and the output of the signal indicating the detection result.

For example, the power supply V1 is constructed by the auxiliary power supply 152.

[Configuration Example of Temperature Detection Circuit 154]

Figure 6:
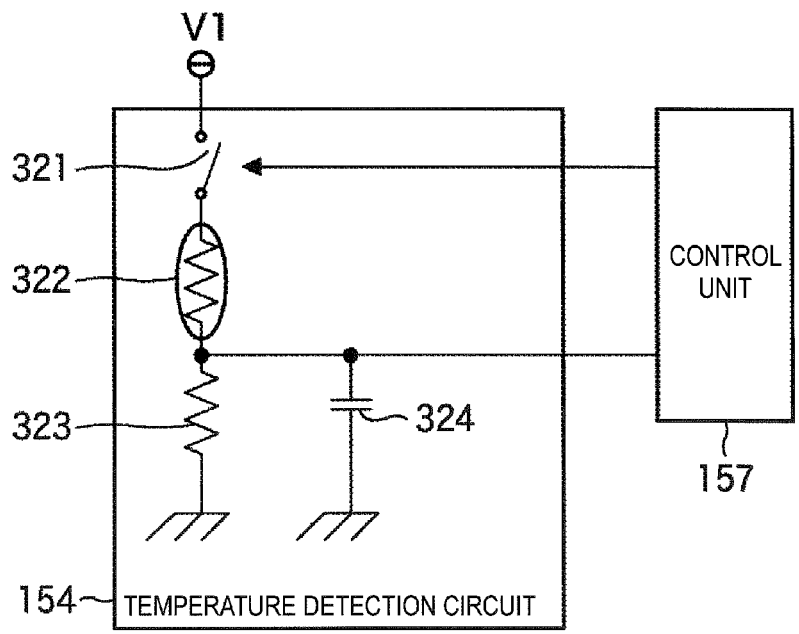
FIG. 6 is a circuit diagram illustrating a configuration example of a temperature detection circuit according to one or more embodiments of the present invention.

FIG. 6 illustrates a configuration example of the temperature detection circuit 154.

The temperature detection circuit 154 includes a semiconductor switch 321, a thermistor 322, a resistor 323, and a capacitor 324.

One end of the semiconductor switch 321 is connected to the power supply V1, and the other end is connected to one end of the thermistor 322. The other end of the thermistor 322 is connected to one end of the resistor 323, one end of the capacitor 324, and the control unit 157. The other end of the resistor 323 and the other end of the capacitor 324 are grounded.

The semiconductor switch 321 is turned on and off under the control of the control unit 157. When the semiconductor switch 321 is turned on, the temperature detection circuit 154 supplies a signal indicating a voltage corresponding to a resistance value of the thermistor 322, which is changed by the temperature Ta, as the detection result of the temperature Ta in the surrounding area of the switching circuit 172 to the control unit 157. On the other hand, when the semiconductor switch 321 is not turned on, the temperature detection circuit 154 supplies the constant (ground level) signal to the control unit 157 irrespective of the temperature Ta.

[Configuration Example of Output Voltage Detection Circuit 155]

Figure 7:
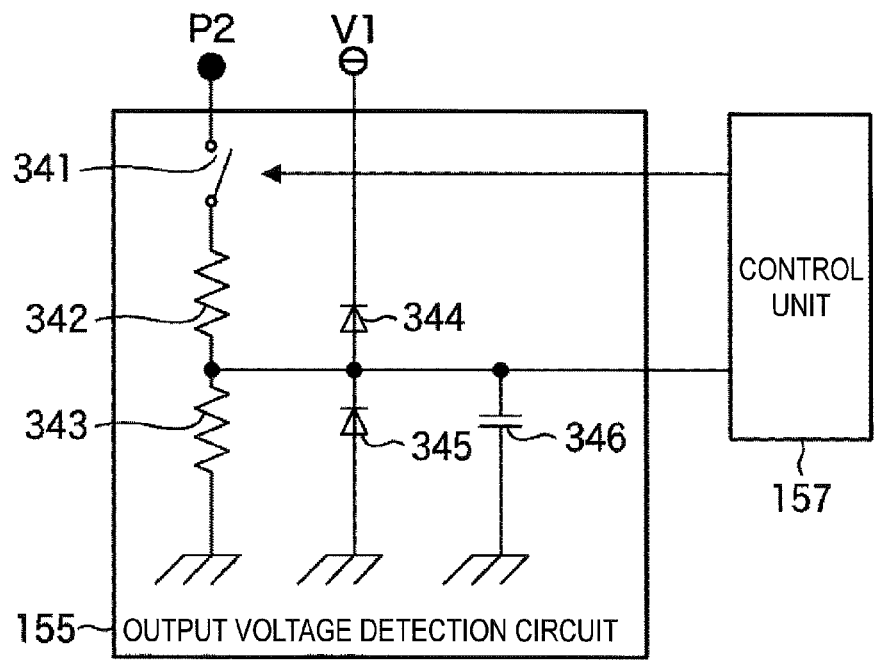
FIG. 7 is a circuit diagram illustrating a configuration example of an output voltage detection circuit according to one or more embodiments of the present invention.

FIG. 7 illustrates a configuration example of the output voltage detection circuit 155.

The output voltage detection circuit 155 includes a semiconductor switch 341, a resistor 342, a resistor 343, a diode 344, a diode 345, and a capacitor 346.

One end of the semiconductor switch 341 is connected to the detection point P2 of the power conversion unit 151 of the DC-DC converter 116, and the other end is connected to one end of the resistor 342. The other end of the resistor 342 is connected to one end of the resistor 343, an anode of the diode 344, a cathode of the diode 345, one end of the capacitor 346, and the control unit 157. The other end of the resistor 343 and the other end of the capacitor 346 are grounded. A cathode of the diode 344 is connected to the power supply V1, and an anode of the diode 345 is grounded.

The semiconductor switch 341 is turned on and off under the control of the control unit 157. When the semiconductor switch 341 is turned on, the output voltage detection circuit 155 supplies a voltage signal corresponding to the output voltage Vout to the control unit 157. On the other hand, when the semiconductor switch 341 is turned off, the output voltage detection circuit 155 supplies the constant (ground level) signal to the control unit 157 irrespective of the output voltage Vout.

[Configuration Example of IG Voltage Detection Circuit 156]

Figure 8:
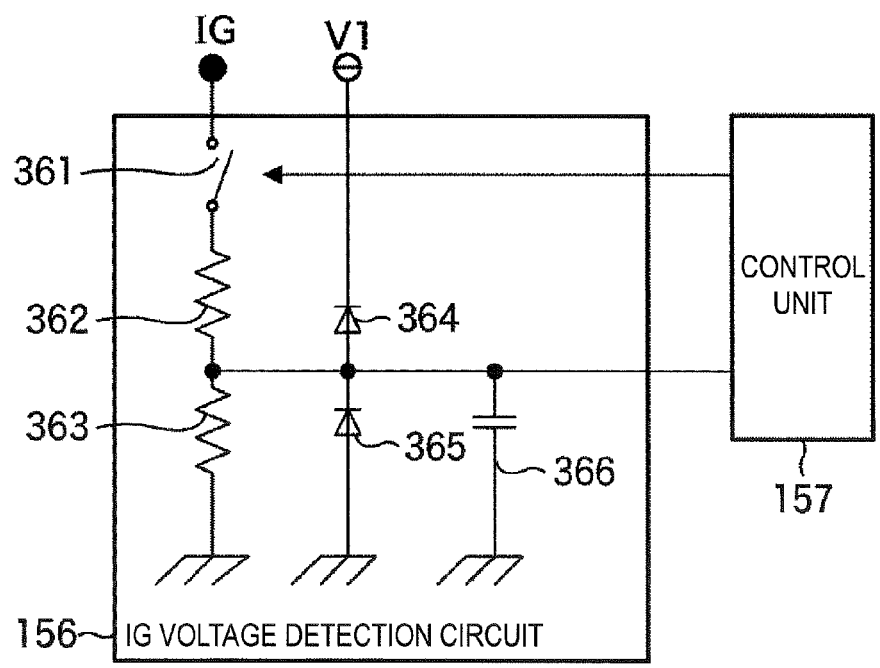
FIG. 8 is a circuit diagram illustrating a configuration example of an IG voltage detection circuit according to one or more embodiments of the present invention.

FIG. 8 illustrates a configuration example of the IG voltage detection circuit 156.

The IG voltage detection circuit 156 includes a semiconductor switch 361, a resistor 362, a resistor 363, a diode 364, a diode 365, and a capacitor 366. The IG voltage detection circuit 156 has the same circuit configuration as the output voltage detection circuit 155 of FIG. 7. One end of the semiconductor switch 361 is connected to the terminal IG of the DC-DC converter 116.

Accordingly, when the semiconductor switch 361 is turned on, the IG voltage detection circuit 156 supplies a voltage signal corresponding to the IG voltage Vig to the control unit 157. On the other hand, when the semiconductor switch 361 is turned off, the IG voltage detection circuit 156 supplies the constant (ground level) signal to the control unit 157 irrespective of the IG voltage Vig.

[Configuration Example of Input Voltage Abnormality Detection Circuit 181]

Figure 9:
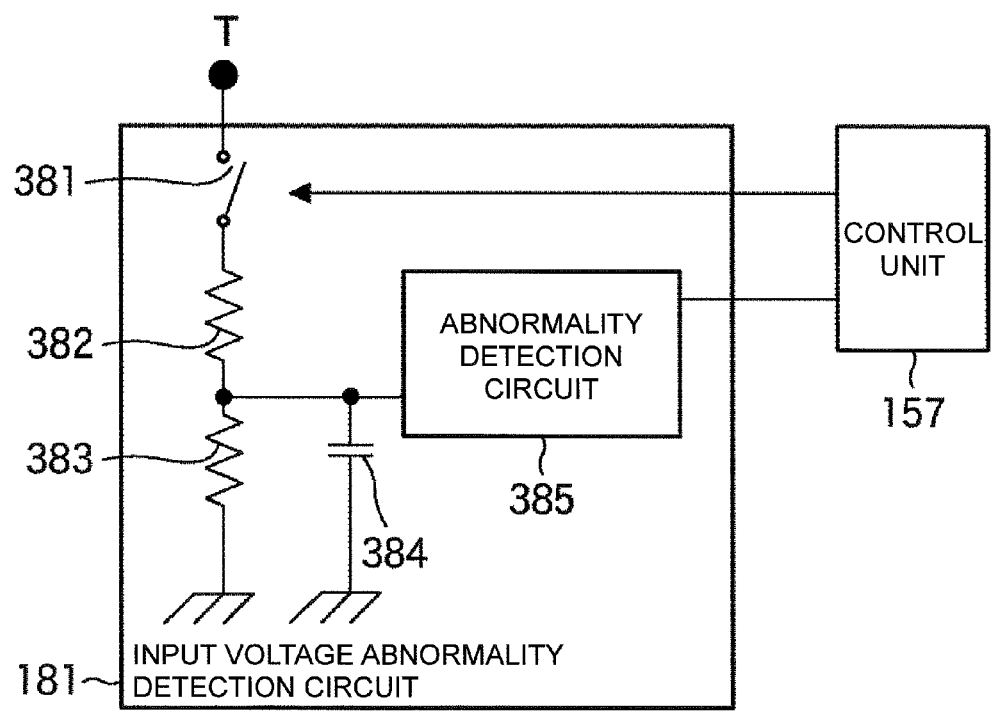
FIG. 9 is a circuit diagram illustrating a configuration example of an input voltage detection circuit according to one or more embodiments of the present invention.

FIG. 9 illustrates a configuration example of the input voltage abnormality detection circuit 181.

The input voltage abnormality detection circuit 181 includes a semiconductor switch 381, a resistor 382, a resistor 383, a capacitor 384, and an abnormality detection circuit 385.

One end of the semiconductor switch 381 is connected to the terminal T of the DC-DC converter 116, and the other end is connected to one end of the resistor 382. The other end of the resistor 382 is connected to one end of the resistor 383, one end of the capacitor 384, and the abnormality detection circuit 385. The other end of the resistor 383 and the other end of the capacitor 384 are grounded. The abnormality detection circuit 385 is connected to the control unit 157.

The semiconductor switch 381 is turned on and off under the control of the control unit 157. When the semiconductor switch 381 is turned on, the abnormality detection circuit 385 detects the existence or non-existence of the abnormality of the input voltage Vin output from the terminal T of the DC-DC converter 116, and supplies a signal indicating a detection result to the control unit 157. On the other hand, when the semiconductor switch 381 is turned off, the abnormality detection circuit 385 stops the detection of the existence or non-existence of the abnormality of the input voltage Vin and the output of the detection result.

[Configuration Example of Control Unit 157]

Figure 10:
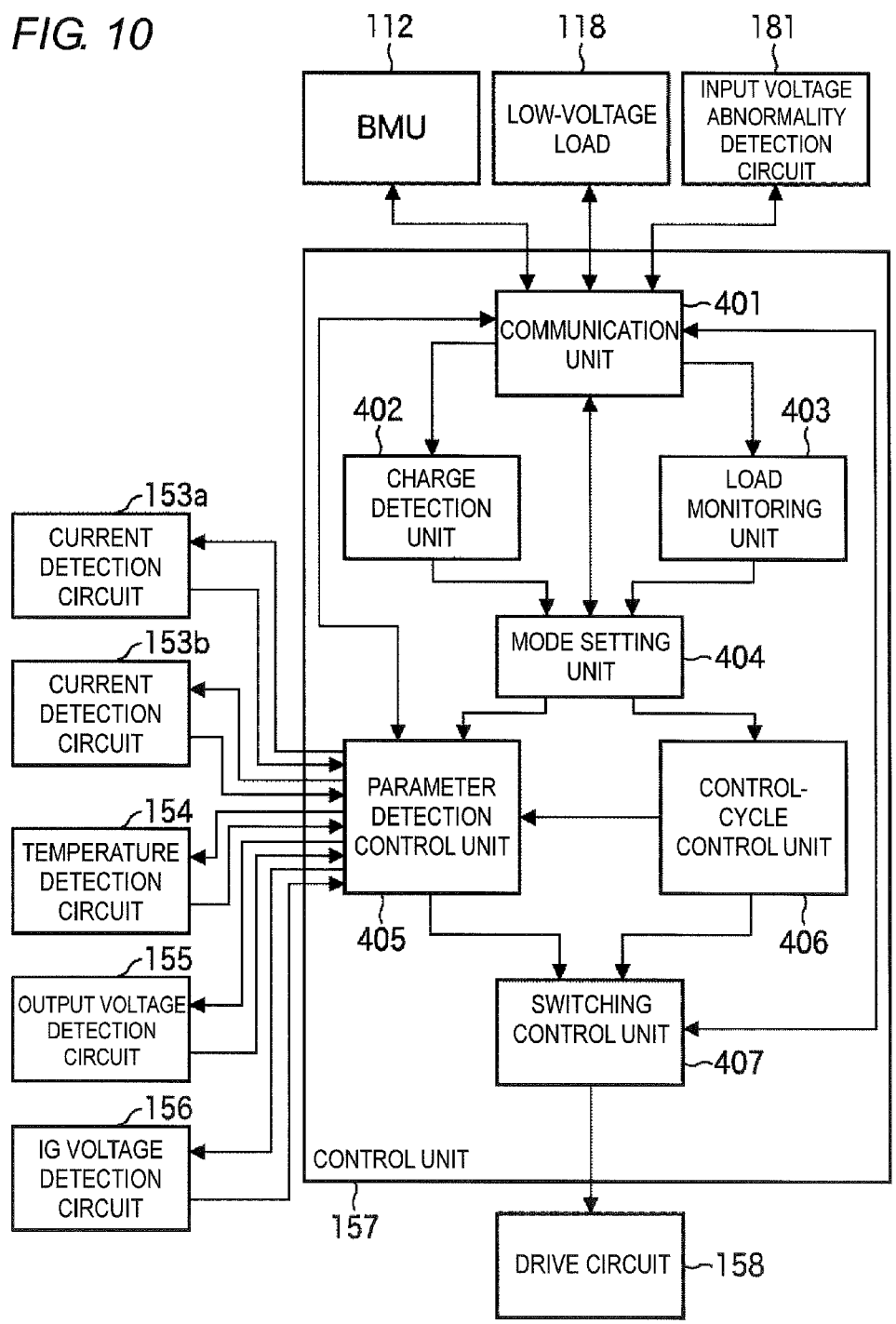
FIG. 10 is a block diagram illustrating a configuration example of a function of a control unit according to one or more embodiments of the present invention.

FIG. 10 is a block diagram illustrating a configuration example of a function of the control unit 157. The control unit 157 includes a communication unit 401, a charge detection unit 402, a load monitoring unit 403, a mode setting unit 404, a parameter detection control unit 405, a control-cycle control unit 406, and a switching control unit 407.

The communication unit 401 conducts communication with the BMU 112, some of the low-voltage loads 118, and the input voltage abnormality detection circuit 181 in conformity to CAN, and transmits and receives various signals and various pieces of information. The communication unit 401 supplies the acquired signal and information to the charge detection unit 402, the load monitoring unit 403, the mode setting unit 404, the parameter detection control unit 405, and the switching control unit 407 as needed.

The charge detection unit 402 detects the existence or non-existence of the charge of the high-voltage battery 113 and the charge method (quick charge or normal charge) based on the information supplied from the BMU 112 through the communication unit 401. The charge detection unit 402 notifies the mode setting unit 404 of the detection result.

The load monitoring unit 403 detects the existence or non-existence of the manipulation performed to the mode switching target load 131, the type of the manipulation, and the state of the mode switching target load 131 based on the information supplied from the BMU 112 through the communication unit 401, and notifies the mode setting unit 404 of the detection result.

The mode setting unit 404 sets the operating mode of the DC-DC converter 116 based on the existence or non-existence of the charge and the charge method of the high-voltage battery 113, the manipulation performed to the mode switching target load, and the state of the mode switching target load. The mode setting unit 404 notifies the parameter detection control unit 405 and the control-cycle control unit 406 of the set operating mode.

The operating mode of the DC-DC converter 116 includes two types of modes of a normal mode and a power saving mode, which will be described later.

The parameter detection control unit 405 detects a parameter that is used to control the drive of the switching element 201a to 201d, and controls turn-on and turn-off of a detection unit that detects the parameter.

Specifically, the parameter detection control unit 405 detects the input current Iin, the output current Iout, the temperature Ta in the surrounding area of the switching circuit 172, and the output voltage Vout, the IG voltage Vig based on the signals supplied from the current detection circuits 153a and 153b, the temperature detection circuit 154, the output voltage detection circuit 155, and the IG voltage detection circuit 156. The parameter detection control unit 405 detects the existence or non-existence of the abnormality of the input voltage Vin based on the signal that is received from the input voltage abnormality detection circuit 181 through the communication unit 401. The parameter detection control unit 405 notifies the switching control unit 407 of the detection result.

The parameter detection control unit 405 controls the turn-on and turn-off of the current detection circuits 153a and 153b, the temperature detection circuit 154, the IG voltage detection circuit 156, and the input voltage abnormality detection circuit 181 according to the operating mode set by the mode setting unit 404.

The control-cycle control unit 406 controls a control cycle of the DC-DC converter 116 according to the operating mode set by the mode setting unit 404. For example, the control-cycle control unit 406 controls a cycle during which the parameter detection control unit 405 detects each parameter. For example, the control-cycle control unit 406 also controls a cycle during which the switching control unit 407 controls the drive of the switching elements 201a to 201d of the switching circuit 172 through the drive circuit 158.

The switching control unit 407 sets the target values of the switching frequency of the switching circuit 172 and the output voltage Vout based on each parameter detected by the parameter detection control unit 405. The switching control unit 407 provides the set target values of the switching frequency and the output voltage Vout as the instruction values to the drive circuit 158, thereby controlling the drive of the switching elements 201a to 201d of the switching circuit 172 through the drive circuit 158.

[Processing Performed by DC-DC Converter 116 During Charge of High-Voltage Battery 113]

Processing performed by the DC-DC converter 116 during the charge of the high-voltage battery 113 will be described below with reference to a flowchart of FIG. 11.

For example, the processing is started when the charge detection unit 402 of the DC-DC converter 116 receives the signal indicating a notification that the charge of the high-voltage battery 113 of the vehicle 101 is started from the BMU 112 through the communication unit 401 at the time the charge of the high-voltage battery 113 is started.

In step S1, the charge detection unit 402 determines whether the charge of the high-voltage battery 113 is the normal charge based on the signal received from the BMU 112. When it is determined that the charge of the high-voltage battery 113 is the normal charge, the processing goes to step S2.

In step S2, the load monitoring unit 403 determines whether the mode switching target load 131 is operated based on the operating signal that is received from the BMU 112 through the communication unit 401. When it is determined that all the mode switching target loads 131 are not operated, the processing goes to step S3.

In step S3, the DC-DC converter 116 performs power saving mode transition processing. Then, the processing goes to step S4.

Figure 12:
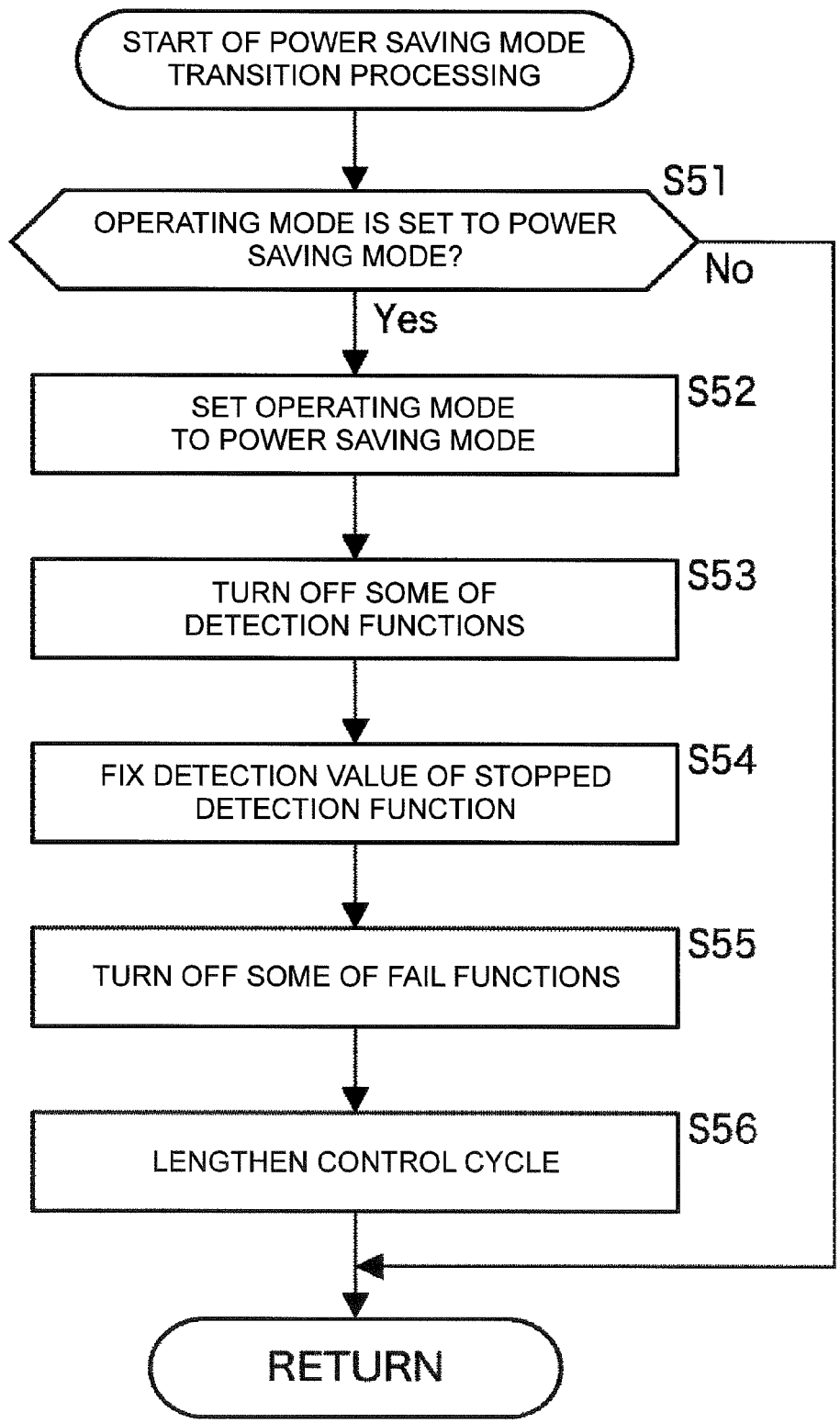
FIG. 12 is a flowchart for explaining a detail of power saving mode transition processing according to one or more embodiments of the present invention.

The detailed power saving mode transition processing will be described with reference to a flowchart of FIG. 12.

In step S51, the mode setting unit 404 determines whether the operating mode is set to the power saving mode. When it is determined that the operating mode is not set to the power saving mode, the processing goes to step S52.

In step S52, the mode setting unit 404 sets the operating mode of the DC-DC converter 116 to the power saving mode. The mode setting unit 404 notifies the parameter detection control unit 405 and the control-cycle control unit 406 that the operating mode is set to the power saving mode.

In step S53, the DC-DC converter 116 turns off some of the detection functions. For example, the parameter detection control unit 405 turns off the semiconductor switch 301 of the current detection circuit 153a, the semiconductor switch 301 of the current detection circuit 153b, the semiconductor switch 321 of the temperature detection circuit 154, the semiconductor switch 361 of the IG voltage detection circuit 156, and the semiconductor switch 381 of the input voltage abnormality detection circuit 181 to stop the operations of the detection circuits. As results, in the plurality of detection circuits, only the output voltage detection circuit 155 is operated.

Therefore, the electric power consumed by the resistor and the sensor of the detection circuit can be reduced in the detection circuit in which the operation is stopped.

In step S54, the parameter detection control unit 405 fixes the detection value of the stopped detection function. Specifically, the parameter detection control unit 405 fixes the detection values of the input current Iin, the output current Iout, the temperature Ta in the surrounding area of the switching circuit 172, and the IG voltage Vig, in which the detection is stopped, to predetermined normal values, and the parameter detection control unit 405 notifies the switching control unit 407 of the normal values. The parameter detection control unit 405 fixes the abnormality detection result of the input voltage Vin to no abnormality, and notifies the switching control unit 407 of no abnormality.

The parameter detection control unit 405 directly notifies the switching control unit 407 of the actual detection value of the output voltage Vout whose detection is continued.

In step S55, the switching control unit 407 turns off some of fail functions. That is, the switching control unit 407 does not perform the fail function to the abnormalities of the input current Iin, the output current Iout, the temperature Ta in the surrounding area of the switching circuit 172, the IG voltage Vig, and the input voltage Vin, in which the detection is stopped.

As used herein, the fail function means a function of performing response processing during the abnormality of the detected parameter. For example, the response processing during the abnormality includes processing for stopping the operation of the switching circuit 172 or processing for lowering the switching frequency in order to avoid the abnormality or a breakdown of the DC-DC converter 116.

Figure 13:
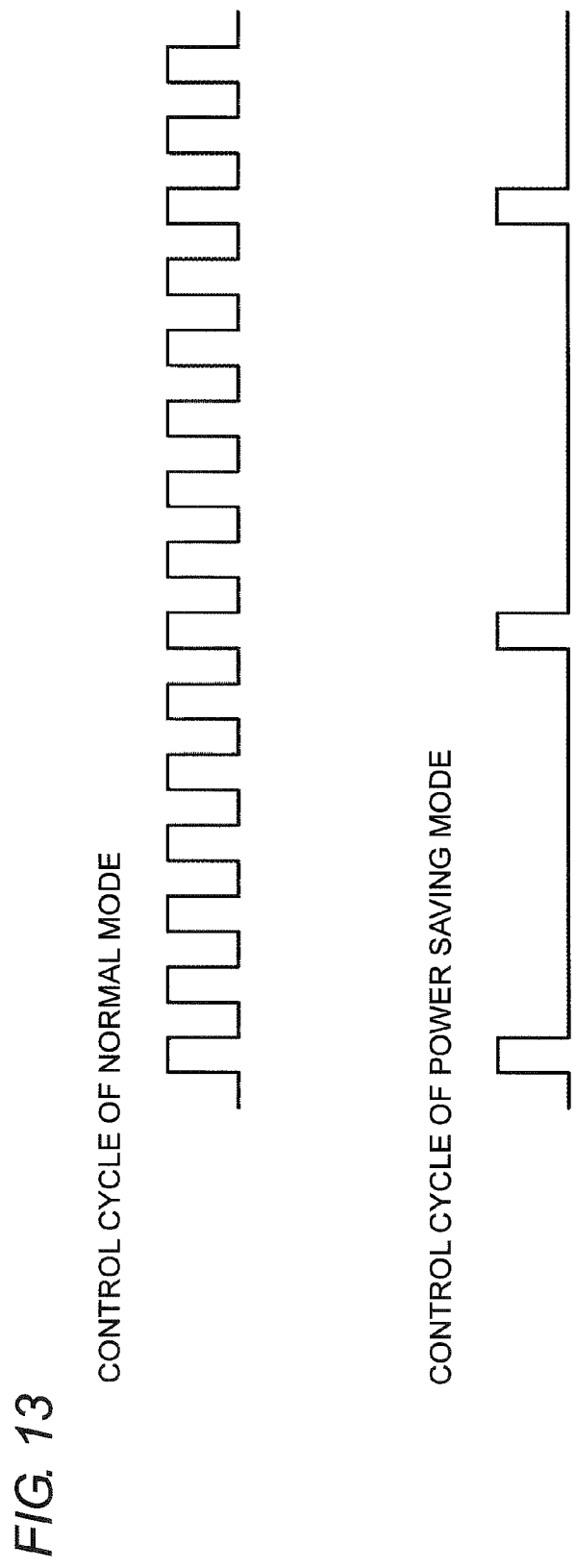
FIG. 13 is a view illustrating a comparison between a control cycle of a normal mode and a control cycle of a power saving mode according to one or more embodiments of the present invention.

In step S56, the control-cycle control unit 406 lengthens the control cycle. For example, the control-cycle control unit 406 lengthens a cycle of a clock signal used to operate the DC-DC converter 116, thereby lengthening the control cycle compared with the normal mode as illustrated in FIG. 13. Therefore, an operating cycle (such as a parameter detection cycle of the parameter detection control unit 405 and a drive control cycle of the switching elements 201a to 201d of the switching control unit 407) of each unit of the DC-DC converter 116 is lengthened, thereby reducing the consumption power.

Then, the power saving mode transition processing is ended.

On the other hand, when it is determined that the operating mode is already set to the power saving mode in step S51, the pieces of processing in steps S52 to S56 are not performed, and the power saving mode transition processing is ended.

It is assumed that the normal charge is performed during nighttime because of a long charge time. Accordingly, there is a low possibility that a person exists in the vehicle 101, and there is also a low possibility that the mode switching target load 131 is operated. Therefore, it is considered that the DC-DC converter 116 has the small load and a significantly small load variation. Therefore, even if some of the fail functions are turned off, or even if the control cycle is lengthened, it is conceivable that there is a little influence on the operation or safety.

As described above, during the normal charge, the operating mode is set to the power saving mode, and the DC-DC converter 116 is operated by the minimum control. As a result, the losses of the DC-DC converter 116 and the peripheries (such as the detection circuit) are reduced to improve the charge efficiency.

Returning to FIG. 11, when it is determined that at least one of the mode switching target loads 131 is operated in step S2, the processing goes to step S4.

In step S4, the DC-DC converter 116 performs normal mode transition processing. Then, the processing goes to step S5.

Figure 14:
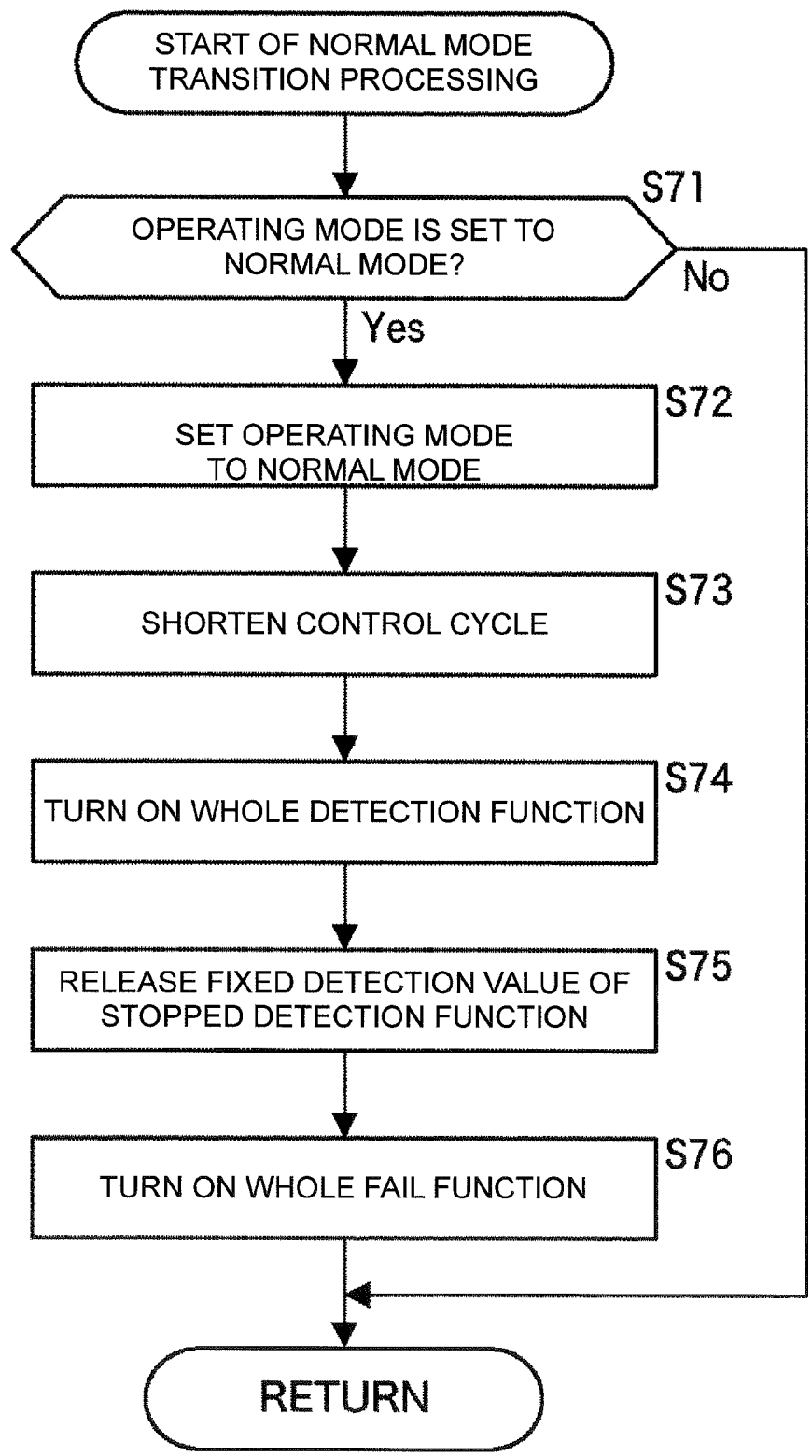
FIG. 14 is a flowchart for explaining a detail of normal mode transition processing according to one or more embodiments of the present invention.

The detailed normal mode transition processing will be described with reference to a flowchart of FIG. 14.

In step S71, the mode setting unit 404 determines whether the operating mode is set to the normal mode. When it is determined that the operating mode is not set to the normal mode, the processing goes to step S72.

In step S72, the mode setting unit 404 sets the operating mode of the DC-DC converter 116 to the normal mode. The mode setting unit 404 notifies the parameter detection control unit 405 and the control-cycle control unit 406 that the operating mode is set to the normal mode.

In step S73, the control-cycle control unit 406 shortens the control cycle. That is, the control-cycle control unit 406 shortens the control cycle, which is set longer through the processing in step S56 of FIG. 12, to return the control cycle to the normal control cycle.

In step S74, the DC-DC converter 116 turns on all the detection functions. That is, the parameter detection control unit 405 turns on all the detection functions that are stopped through the processing in step S53 of FIG. 12.

In step S75, the parameter detection control unit 405 releases the fixing of the detection values of the stopped detection functions. That is, the parameter detection control unit 405 notifies the switching control unit 407 of the actually detected value, in which the switching control unit 407 is notified of the predetermined fixed value through the processing in step S54 of FIG. 12.

In step S76, the DC-DC converter 116 turns on all the fail functions. That is, the DC-DC converter 116 turns on all the fail functions that are stopped through the processing in step S55 of FIG. 12.

Then, the normal mode transition processing is ended.

On the other hand, when it is determined that the operating mode is already set to the normal mode in step S71, the pieces of processing in steps S72 to S76 are not performed, and the normal mode transition processing is ended.

As described above, in the case that the mode switching target load 131 is operated at the beginning of the normal charge, the load of the DC-DC converter 116 is increased and the load variation is also increased. Therefore, the DC-DC converter 116 is operated by the normal control.

Returning to FIG. 11, in step S5, the load monitoring unit 403 determines whether a start-up manipulation of the mode switching target load 131 is performed. When detecting that the start-up manipulation of at least one of the mode switching target loads 131 is performed based on the operating signal received from the BMU 112 through the communication unit 401, the load monitoring unit 403 determines that the start-up manipulation of the mode switching target load 131 is performed. Then, the processing goes to step S6.

In step S6, the DC-DC converter 116 performs the normal mode transition processing similarly to the processing in step S4. Then, the processing goes to step S9.

In the case that the start-up manipulation is performed to the mode switching target load 131 during the normal charge, the load of the DC-DC converter 116 is increased, and the load variation is also increased. Therefore, the operating mode is returned to the normal mode, and the DC-DC converter 116 is operated by the normal control.

The operating mode transitions to the normal mode at the time the start-up manipulation of the mode switching target load 131 is determined to be performed, thereby properly being able to respond to the transient voltage or the current variation during the start-up of the mode switching target load 131. On the other hand, in the case that the operating mode transitions to the normal mode after the mode switching target load 131 is actually started up, the DC-DC converter 116 is operated in the power saving mode during the start-up of the mode switching target load 131, whereby it is conceivable that the proper response cannot be performed for the transient voltage or the current variation.

Returning to FIG. 11, in step S5, when it is determined that the start-up manipulation of the mode switching target load 131 is not performed, the processing goes to step S7.

In step S7, the load monitoring unit 403 determines whether the all the mode switching target loads 131 are stopped based on the operating signal received from the BMU 112 through the communication unit 401. When it is determined that all the mode switching target loads 131 are stopped, the processing goes to step S8.

In step S8, the power saving mode transition processing is performed similarly to the processing in step S3. Therefore, the start-up manipulation is performed to at least one of the mode switching target loads 131, and the operating mode transitions to the normal mode. Then, the operating mode transitions to the power saving mode at the time all the mode switching target loads 131 are stopped.

On the other hand, when it is determined that at least one of the mode switching target loads 131 is operated in step S7, the processing in step S8 is skipped, and the processing goes to step S9.

In step S9, the charge detection unit 402 determines whether an instruction to end the charge is issued based on the signal received from the BMU 112 through the communication unit 401. When it is determined that the instruction to end the charge is not issued, the processing goes to step S10.

In step S10, the charge detection unit 402 determines whether the high-voltage battery 113 is fully charged based on the signal received from the BMU 112 through the communication unit 401. When it is determined that the high-voltage battery 113 is not fully charged, the processing returns to step S5.

The pieces of processing in steps S5 to S10 are repeated until it is determined that the instruction to end the charge is issued in step S9 or until it is determined that the high-voltage battery 113 is fully charged in step S10.

Figure 11:
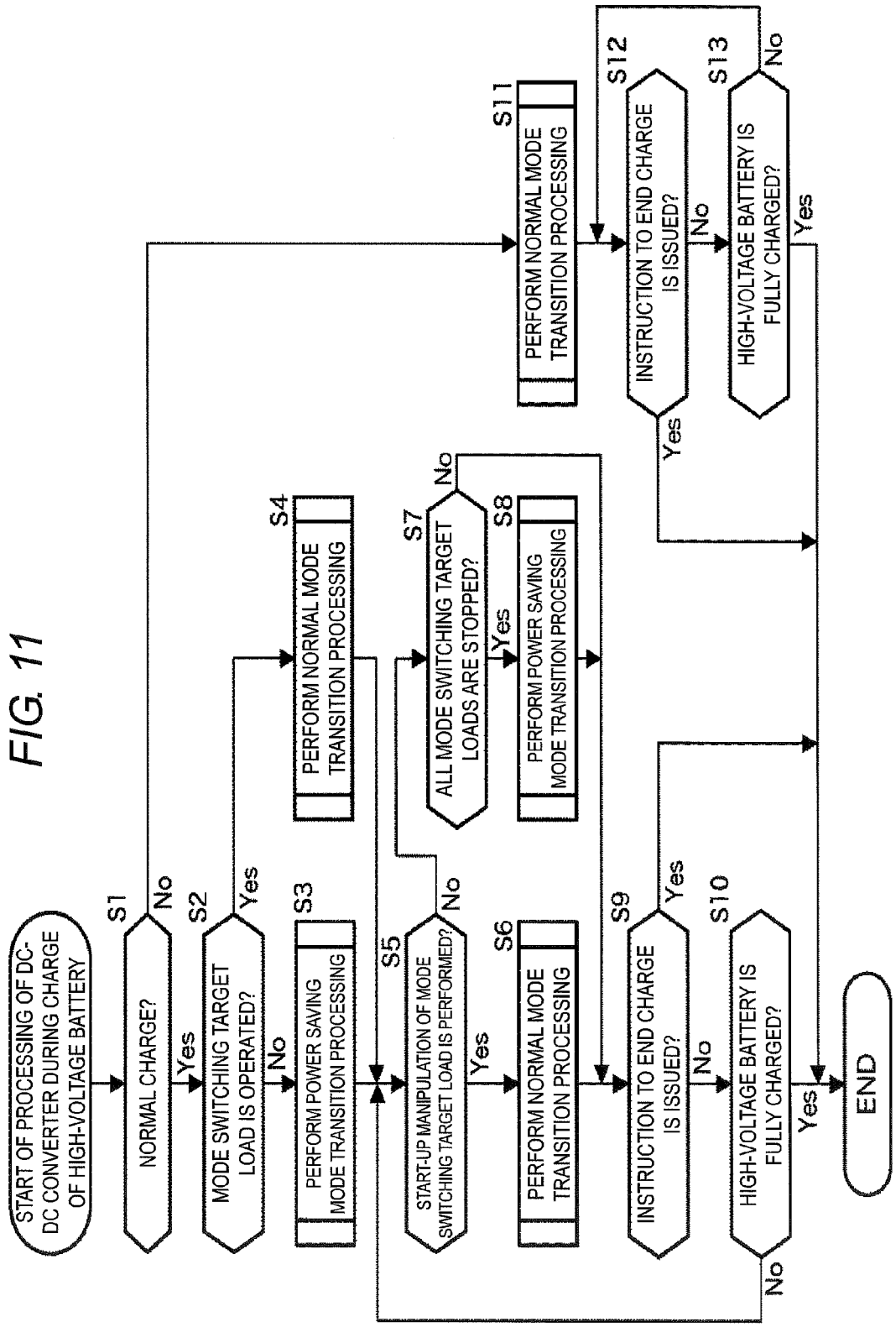
FIG. 11 is a flowchart for explaining processing performed by the DC-DC converter during high-voltage battery changing according to one or more embodiments of the present invention.

On the other hand, when it is determined that the instruction to end the charge is issued in step S9 or when it is determined that the high-voltage battery 113 is fully charged in step S10, the processing of FIG. 11 is ended.

On the other hand, when it is determined that the charge of the high-voltage battery 113 is the quick charge in step S1, the processing goes to step S11.

In step S11, the normal mode transition processing is performed similarly to the processing in step S4.

In step S12, whether the instruction to end the charge is issued is determined similarly to the processing in step S9. When it is determined that the instruction to end the charge is not issued, the processing goes to step S13.

In step S13, whether the high-voltage battery 113 is fully charged is determined similarly to the processing in step S10. When it is determined that the high-voltage battery 113 is not fully charged, the processing returns to step S12.

The pieces of processing in steps S12 and S13 are repeated until it is determined that the instruction to end the charge is issued in step S12 or until it is determined that the high-voltage battery 113 is fully charged in step S13.

On the other hand, when it is determined that the instruction to end the charge is issued in step S12 or when it is determined that the high-voltage battery 113 is fully charged in step S13, the processing of FIG. 11 is ended.

Specifically, in the case of the quick charge, the charge time is shortened, the consumption power of the DC-DC converter 116 has a little influence on the charge efficiency, a person exists in a vehicle, and the probably the low-voltage load 118 is operated. Therefore, the DC-DC converter 116 is operated in the normal mode.

Basically, the dc-DC converter 116 is operated in the power saving mode during the normal charge of the high-voltage battery 113, so that the consumption power can be reduced to improve the charge efficiency.

When the start-up manipulation of the mode switching target load 131 is performed even in the normal charge of the high-voltage battery 113, the operating mode transitions quickly to the normal mode. Therefore, the mode switching target load 131 can normally be operated.

Modifications according to one or more embodiments of the present invention will be described below.

[First Modification]

Figure 15:
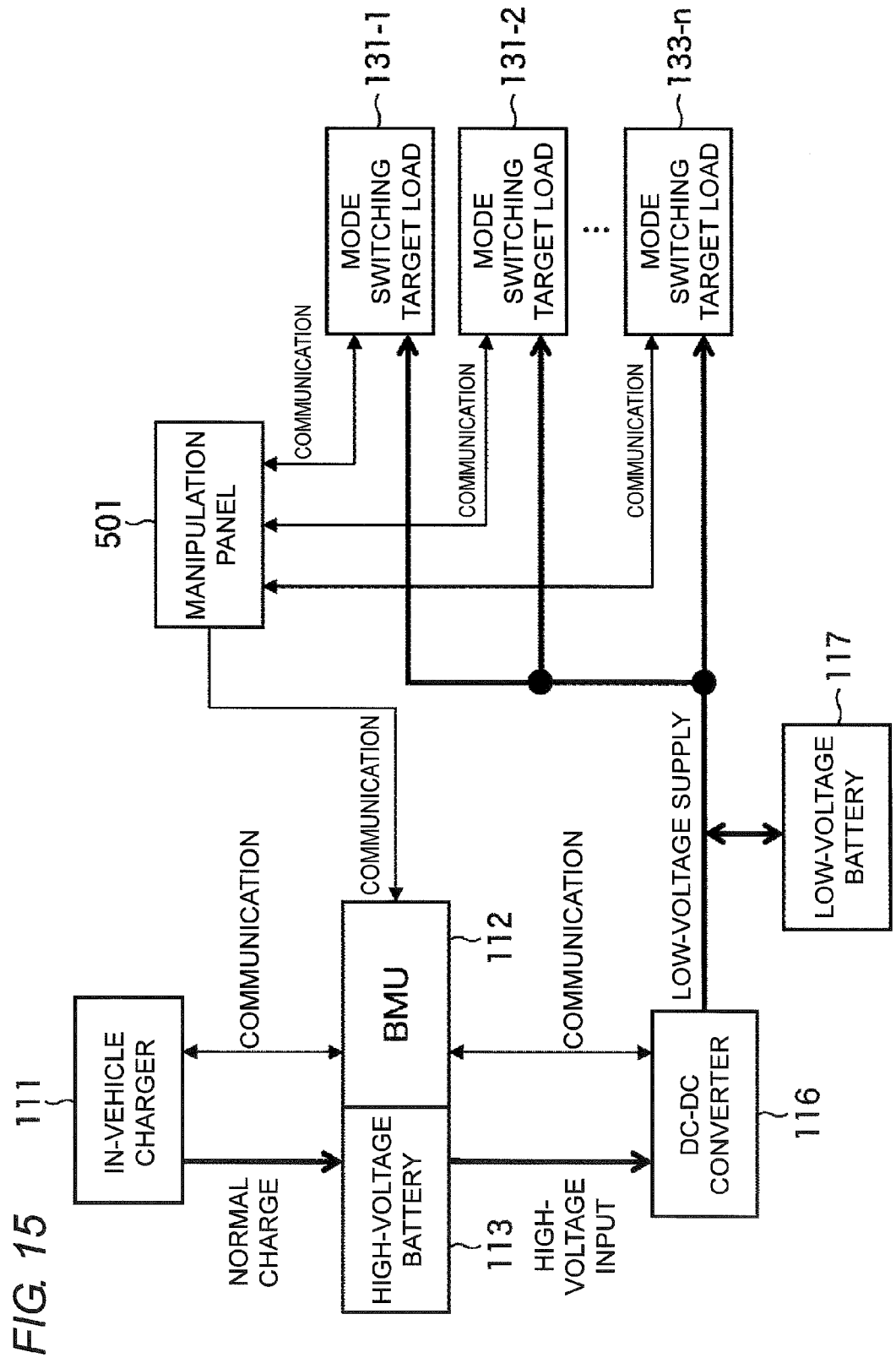
FIG. 15 is a block diagram illustrating another example of the supply route of the electric power and the communication route according to one or more embodiments of the present invention.

For example, as illustrated in FIG. 15, the manipulation of each mode switching target load 131 is performed from a manipulation panel 501, and the operating signal of the mode switching target load 131 may be supplied to the BMU 112 from the manipulation panel 501.

The manipulation panel 501 is one of the low-voltage loads 118, and the manipulation panel 501 provides a user interface in order to manipulate the mode switching target load 131.

Figure 16:
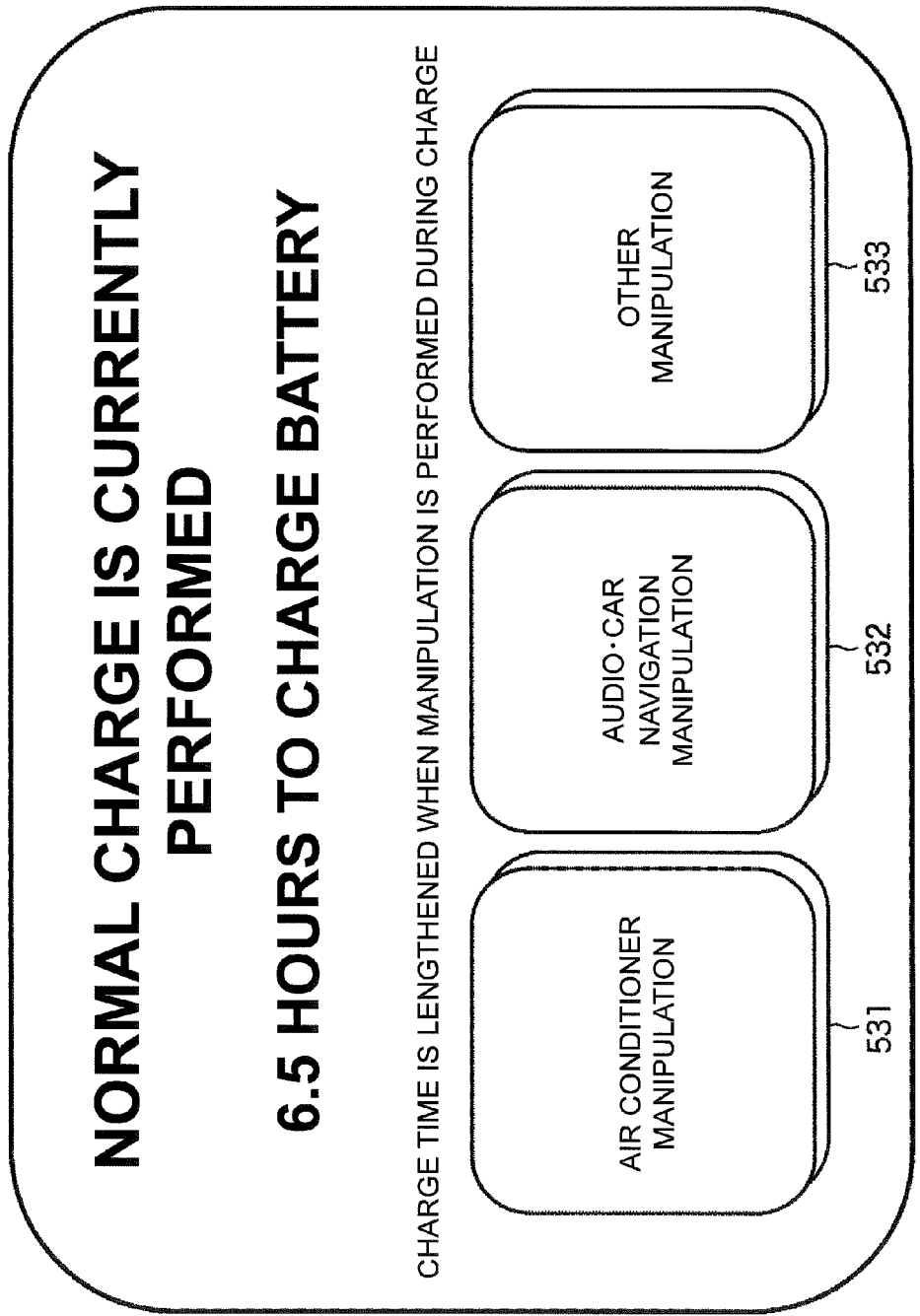
FIG. 16 illustrates a first example of a manipulation screen displayed on a manipulation panel according to one or more embodiments of the present invention.
Figure 17:
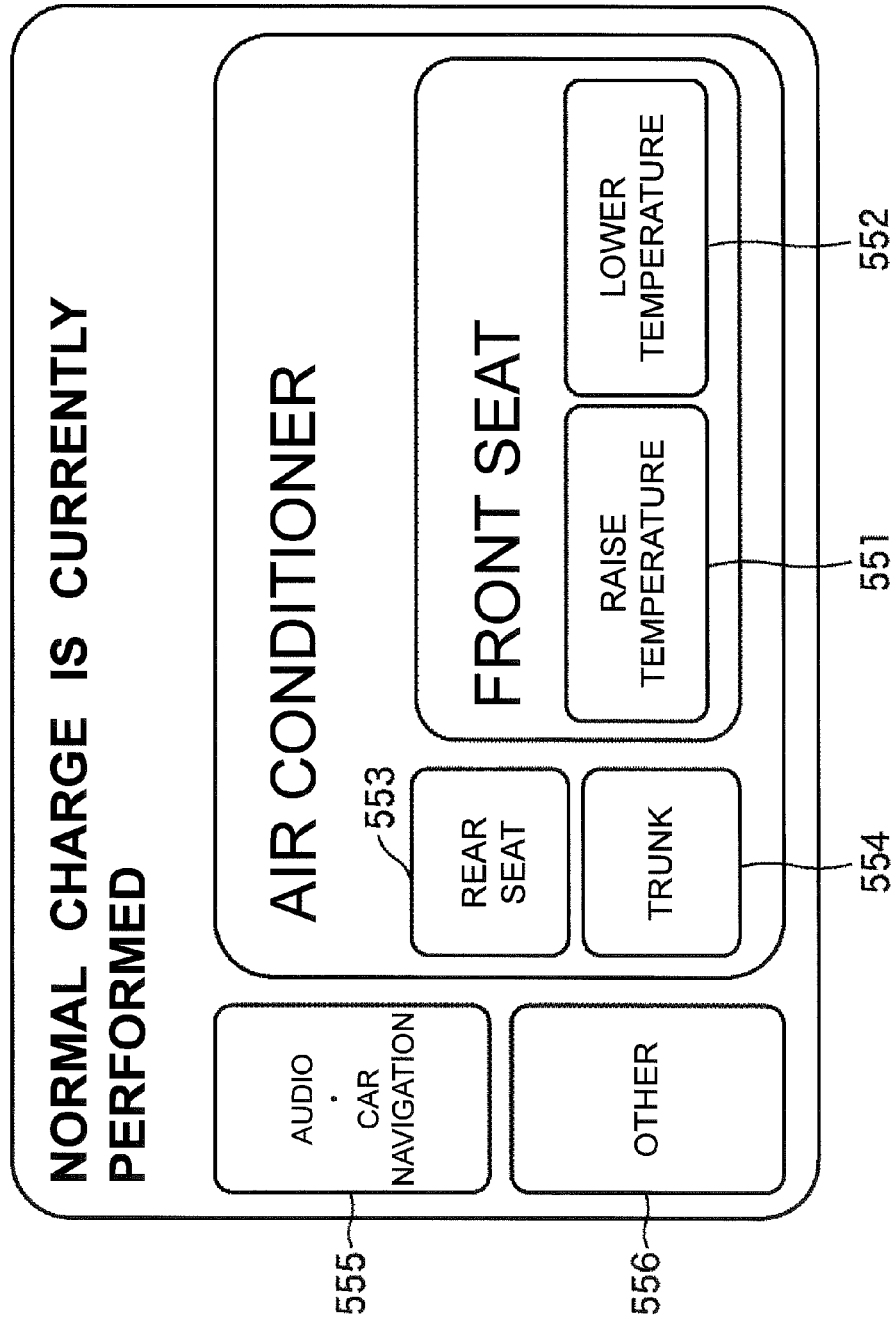
FIG. 17 illustrates a second example of the manipulation screen displayed on the manipulation panel according to one or more embodiments of the present invention.

FIGS. 16 and 17 illustrate examples of the manipulation screen displayed on the manipulation panel 501.

FIG. 16 illustrates an example of the manipulation screen displayed on the manipulation panel 501 during the normal charge of the vehicle 101. That the normal charge is currently performed is displayed on the manipulation screen, and a time to charge the battery is also displayed on the manipulation screen.

Buttons 531 to 533 are also displayed on the manipulation screen in order to manipulate the mode switching target loads 131. Specifically, the button 531 displays the manipulation screen (of the control circuit) of the air conditioner that is one of the mode switching target loads 131. The button 532 displays the manipulation screen of the car audio device and the car navigation device that are of one of the mode switching target loads 131. The button 533 displays the manipulation screen of other mode switching target load 131.

FIG. 17 illustrates an example of a manipulation screen that is displayed when the button 531 is pressed on the manipulation screen of FIG. 16. That the normal charge is currently performed is displayed on the manipulation screen.

Buttons 551 to 556 are also displayed on the manipulation screen in order to manipulate the mode switching target loads 131. Specifically, the buttons 551 and 552 are used to raise and lower the temperature of the air conditioner at the front seat of the vehicle 101. The button 553 displays the manipulation screen of the temperature setting of the air conditioner at the rear seat of the vehicle 101. The button 554 displays the manipulation screen of the temperature setting of the air conditioner in the trunk of the vehicle 101. The button 555 displays the manipulation screen of the car audio device and the car navigation device. The button 556 displays the manipulation screen of other device.

The manipulation panel 501 conducts communication with the mode switching target load 131 and the BMU 112 in conformity to CAN. The manipulation panel 501 transmits the signal indicating the type of the manipulation performed by the user and the like to the mode switching target load 131, and receives the signal indicating the state of the mode switching target load 131 and the like from the mode switching target load 131. The manipulation panel 501 transmits the operating signals indicating the type of the manipulation performed by the user, the state of the mode switching target load 131, and the like to the BMU 112, and receives the information indicating the charge state of the high-voltage battery 113 and the like from the BMU 112.

[Second Modification]

In one or more embodiments, the combination of the types of the detection functions that are stopped in the power saving mode are described by way of example. Alternatively, another combination may be adopted.

[Third Modification]

In one or more embodiments, some of the detection functions are stopped in the power saving mode. Alternatively, some of the detection functions are not stopped, but the detection cycle may be lengthened.

[Fourth Modification]

Other control cycles except the detection cycles of the above parameters and the drive control cycles of the switching elements 201a to 201d may be lengthened in the power saving mode.

The above string of pieces of processing may be performed by either hardware or software. In the case that the string of pieces of processing is performed by the software, a program constituting the software is installed in a computer. Examples of the computer include a computer that is incorporated in the dedicated hardware such as the control unit 157 and a general-purpose computer that can executes various functions by installing various programs.

The program executed by the computer may be a program in which the processing is performed in time series along the procedure described in the specification or a program in which the processing is performed in parallel or at a necessary time a call is performed.

The present invention is not limited to the embodiments presented above, but various changes can be made without departing from the scope of the present invention. While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A power conversion apparatus comprising:
   a switching element that is driven to step down a voltage of a first battery for running an electric vehicle, the stepped-down voltage being supplied to a second battery and a plurality of loads;
   a switching control unit that controls drive of the switching element;
   a load monitoring unit that detects existence or non-existence of a start-up manipulation of a predetermined target load in the loads;
   a charge detection unit that detects existence or non-existence of a charge and a charge method of the first battery;
   a mode setting unit that sets a supply operating mode of the power conversion apparatus to a second mode whose consumption power is less than that of a first mode during the charge of the first battery, and changes the second mode to the first mode when the load monitoring unit detects the start-up manipulation of the target load while the supply operating mode is set to the second mode; and
   a control-cycle control unit that lengthens a control cycle of the power conversion apparatus compared with the first mode when the supply operating mode is set to the second mode.

2. The power conversion apparatus according to claim 1, wherein the load monitoring unit further detects a state of the target load, and
   wherein the mode setting unit sets the supply operating mode to the first mode when the target load is operated at the beginning of a normal charge of the first battery.

3. The power conversion apparatus according to claim 2, wherein the mode setting unit changes the first mode to the second mode when the stops of all the target load are detected while the supply operating mode is set to the first mode during the normal charge of the first battery.

4. The power conversion apparatus according to claim 1, wherein the mode setting unit fixes the supply operating mode to the first mode during a quick charge of the first battery.

5. The power conversion apparatus according to claim 1, further comprising
   a parameter detection control unit that stops detection of at least one parameter, which is used to control the drive of the switching element, when the supply operating mode is set to the second mode,
   wherein the switching control unit does not perform response processing during an abnormality of the parameter, in which the detection is stopped, when the supply operating mode is set to the second mode.

6. The power conversion apparatus according to claim 5, wherein the control cycle includes at least one of a cycle during which the parameter used to control the drive of the switching element is detected and a cycle during which the drive of the switching element is controlled.

7. The power conversion apparatus according to claim 1, further comprising
   a parameter detection control unit that stops detection of at least one parameter, which is used to control the drive of the switching element, when the supply operating mode is set to the second mode,
   wherein the control cycle includes at least one of a cycle during which the parameter used to control the drive of the switching element is detected and a cycle during which the drive of the switching element is controlled.

8. A power control method performed by a power conversion apparatus, which includes a switching element that is driven to step down a voltage of a first battery for running an electric vehicle, the stepped-down voltage being supplied to a second battery and a plurality of loads, the power control method comprising:
   detecting existence or non-existence of a start-up manipulation of a predetermined target load in the loads;
   detecting existence or non-existence of a charge and a charge method of the first battery;
   setting a supply operating mode of the power conversion apparatus to a second mode whose consumption power is less than that of a first mode during the charge of the first battery, and changing the second mode to the first mode when the start-up manipulation of the target load is detected while the supply operating mode is set to the second mode; and
   lengthening a control cycle of the power conversion apparatus compared with the first mode when the supply operating mode is set to the second mode.

* * * * *